(12) United States Patent
Fredericks et al.

(10) Patent No.: US 8,140,361 B2
(45) Date of Patent: *Mar. 20, 2012

(54) SYSTEM AND METHOD FOR INTEGRATED TRAVEL AND EXPENSE MANAGEMENT

(75) Inventors: Michael Fredericks, Fairfax, VA (US); Joseph Dunnick, Baltimore, MD (US); Valery Gorodnichev, Skokie, IL (US); Jeannine Armstrong, Seacliff, NJ (US)

(73) Assignee: Concur Technologies, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/755,127

(22) Filed: Apr. 6, 2010

(65) Prior Publication Data
US 2010/0257003 A1  Oct. 7, 2010

Related U.S. Application Data

(63) Continuation of application No. 10/373,096, filed on Feb. 26, 2003, now Pat. No. 7,720,702.

(51) Int. Cl.
*G06Q 10/00* (2012.01)
(52) U.S. Cl. .......... 705/6; 705/1.1; 705/5; 705/13; 340/4.6
(58) Field of Classification Search ............. 705/1.1, 705/14.32, 14.47, 6, 3, 5; 340/4.6
See application file for complete search history.

(56) References Cited

U.S. PATENT DOCUMENTS

| | | | |
|---|---|---|---|
| 5,191,523 A | 3/1993 | Whitesage | |
| 5,570,283 A | 10/1996 | Shoolery et al. | |
| 5,648,900 A | 7/1997 | Bowen et al. | |
| 5,739,512 A | 4/1998 | Tognazzini | |
| 5,832,451 A | 11/1998 | Flake et al. | |
| 5,832,454 A | 11/1998 | Jafri et al. | |
| 5,899,981 A | 5/1999 | Taylor et al. | |
| 5,948,040 A | 9/1999 | Delorme et al. | |
| 6,009,408 A | 12/1999 | Buchanan | |
| 6,023,679 A | 2/2000 | Acebo et al. | |
| 6,029,144 A | 2/2000 | Barrett et al. | |
| 6,115,680 A | 9/2000 | Coffee et al. | |
| 6,307,572 B1 | 10/2001 | Demarcken et al. | |
| 6,442,526 B1* | 8/2002 | Vance et al. | 705/5 |
| 6,446,048 B1 | 9/2002 | Wells et al. | |
| 7,050,986 B1 | 5/2006 | Vance et al. | |
| 7,103,558 B1 | 9/2006 | Patton et al. | |
| 7,249,041 B2 | 7/2007 | Last | |

(Continued)

OTHER PUBLICATIONS

Office Action issued on Jul. 12, 2007, in U.S. Appl. No. 10/373,096.

(Continued)

*Primary Examiner* — Heidi Riviere
(74) *Attorney, Agent, or Firm* — DLA Piper LLP US

(57) ABSTRACT

The present invention provides a system and method for integrating travel and expense management. The present invention enables an entity to integrate not only data that matches exactly, but also determine the likelihood that data that does not match exactly nevertheless corresponds to each other. The system comprises: a network; at least one terminal coupled to the network; and at least one server coupled to the network. The server comprises a program that includes: retrieving travel data records corresponding to travel requests; retrieving expense data records reflecting expense transactions; comparing the expense data records to the travel data records; and determining a likelihood that the expense data records match the travel data records.

24 Claims, 16 Drawing Sheets

U.S. PATENT DOCUMENTS

| | | | |
|---|---|---|---|
| 7,343,295 | B2 | 3/2008 | Pomerance |
| 7,395,231 | B2 | 7/2008 | Steury et al. |
| 7,409,643 | B2 | 8/2008 | Daughtrey |
| 7,483,883 | B2 | 1/2009 | Barth et al. |
| 7,493,261 | B2 | 2/2009 | Chen et al. |
| 7,502,746 | B2 | 3/2009 | Bertram et al. |
| 7,516,089 | B1 | 4/2009 | Walker et al. |
| 7,539,620 | B2 | 5/2009 | Winterton et al. |
| 7,548,615 | B2 | 6/2009 | Bhalgat et al. |
| 2002/0042715 | A1 | 4/2002 | Kelley |
| 2002/0077871 | A1 | 6/2002 | Udelhoven et al. |
| 2002/0100803 | A1 | 8/2002 | Sehr |
| 2002/0095256 | A1 | 9/2002 | Masaki et al. |
| 2002/0152100 | A1 | 10/2002 | Chen et al. |
| 2003/0036918 | A1 | 2/2003 | Pintsov |
| 2003/0040987 | A1 | 2/2003 | Hudson et al. |
| 2003/0115141 | A1 | 6/2003 | Felix et al. |
| 2003/0120526 | A1 | 6/2003 | Altman et al. |
| 2003/0225600 | A1 | 12/2003 | Slivka et al. |
| 2004/0083134 | A1 | 4/2004 | Spero et al. |
| 2004/0167808 | A1 | 8/2004 | Fredericks et al. |
| 2004/0243489 | A1 | 12/2004 | Mitchell et al. |
| 2005/0108117 | A1 | 5/2005 | Newman |
| 2005/0222944 | A1 | 10/2005 | Dodson, Jr. et al. |
| 2006/0212321 | A1 | 9/2006 | Vance et al. |
| 2008/0319808 | A1 | 12/2008 | Wofford et al. |

OTHER PUBLICATIONS

Office Action issued on Feb. 11, 2008 in U.S. Appl. No. 10/737,096.
Office Action issued on Feb. 11, 2008 in U.S. Appl. No. 11/159,398.
Office Action issue in U.S. Appl. No. 10/373,096 issued on May 20, 2008.
Final Office Action issued in U.S. Appl. No. 11/159,398 mailed Nov. 12, 2008.
Final Office Action issued in U.S. Appl. No. 10/373,096 mailed Nov. 13, 2008.
Office Action issued in U.S. Appl. No. 10/373,096 mailed May 22, 2009.
Office Action issued in U.S. Appl. No. 11/159,398, mailed Jul. 20, 2009.
Office Action issued in U.S. Appl. No. 11/763,562, mailed Oct. 5, 2009.
Office Action issued in U.S. Appl. No. 11/159,398, mailed Mar. 30, 2010.
Notice of Allowance issued in U.S. Appl. No. 10/373,096, mailed Mar. 24, 2010.
File History of U.S. Appl. No. 10/373,096.
File History of U.S. Appl. No. 10/270,672.
File History of U.S. Appl. No. 12/773,282.
File History of U.S. Appl. No. 11/159,398.
File History of U.S. Appl. No. 11/763,562.
File History of U.S. Appl. No. 12/901,947.
"Gelco Information", Business Wire, Mar. 17, 1998.
"American Express Announces New Features in the latest Release of AXI(SM) at Corporate Travel World", PR Newswire, Mar. 2, 1998, p0302NYM159.
PR Newswire, Concur Technologies Launches Concur Expense 7.0, Jul. 24, 2003, p. 1.
Office Action issued in U.S. Appl. No. 12/773,282, dated Jan. 19, 2012.

* cited by examiner

SYSTEM AND METHOD FOR INTEGRATED TRAVEL AND EXPENSE MANAGEMENT

CROSS REFERENCE TO RELATED APPLICATIONS

This application is a continuation of U.S. patent application Ser. No. 10/373,096, filed Feb. 26, 2003, which is incorporated by reference in its entirety.

FIELD OF THE INVENTION

The present invention relates to the field of travel and expense management, and in particular to a system and method for integrating travel and other expenses in an automated fashion.

BACKGROUND OF THE INVENTION

Background of the Technology

Travel and travel-related expenses constitute a large expense facing organized entities. There is a need in the art to better analyze, monitor, and control these expenses, while maintaining accuracy and increasing worker productivity. For example, reducing time spent on expense reports allows workers to spend more time on core job functions.

Automated expense management systems have moved the traditional paper-based travel expense reporting process online. Credit card data feeds contain credit card transaction information. Travel data feeds also exist that contain information about travel reservations obtained from either the travel agency or from a Global Distribution System (GDS) vendor (e.g., Apollo, Sabre, Galileo, Amadeus, Worldspan). Although it is useful to import credit card data feed and travel data feed information into expense reports, there is a need to make the data more useful and reliable. For example, it is difficult to exactly predict a car rental expense prior to a trip (e.g., a traveler may return a car with an empty tank of fuel and owe more than the base rate, a traveler may opt to use the rental company's insurance policy, a rental car may be returned early or late, and taxes may not be provided on the data feed). Hotel expenses are also difficult to predict (e.g., telephone or room service are not on the reservation, a traveler may check out early or late). In addition, a traveler often calls the vendor (e.g., car rental company, hotel) directly and changes or cancels the reservation, and that change is often not reflected in the GDS.

Air ticket information on travel data feeds is typically more accurate than hotel or car information because the ticket purchase occurs within the GDS system (whereas hotel and car payments typically occur at the end of the stay or rental) and because the GDS systems were originally built for the specific purpose of handling air ticket reservations and purchases. However, inaccuracies still arise. For example, with some refundable air tickets, the traveler can exchange the ticket at the airport for a different ticket, and this refund may not be reflected in the data available to the agency because the traveler bypassed the agency and went straight to the airline.

For these reasons, credit card data feeds, where exact costs are known, are more reliable and accurate than travel data feeds. In fact, use of only travel data feeds alone may actually decrease accuracy, as the fees in the travel data feeds are often inaccurate. If the traveler does not correct the fee, a reimbursement could be issued for an incorrect amount, causing accounting problems.

It is also useful to have expenses submitted match not only the credit card data feeds, but also the travel data feeds. If certain data matches the credit card data feed, then management reliably knows what expenses have been booked and not yet expensed, providing a good estimate of amounts owed to employees. In addition, travel data feeds often contain more information than the credit card data feeds. Access to this additional information for reporting and data-mining purposes enables management to make better business decisions.

Attempts to link credit card data feed information with travel data feed information provide many challenges. Comparing the two data feeds to each other to find exact matches does not address many real-world situations. For example, travel data feed information is typically available before a trip takes place. Credit card data feed information is typically unavailable until several days after the credit card charge has occurred. With central billing cards or "ghost cards," the charge data is often not available until the end of a month in which the expense was incurred. Travelers often want to submit travel reports as soon as possible upon returning to expedite reimbursement. If the traveler has already created an expense report with the travel data on it and submitted it prior to the credit card data becoming available, there is a need to associate the credit card record with the already-submitted expense report. This association should be performed: to prevent duplicate submission (and possibly double-reimbursement) of the same expenses; to check the amount of the expense (travel data feeds often have inaccurate amounts, and manually-inputted expense items may contain user errors); and to link the credit card data to the expense for reporting purposes.

In addition, data feeds often contain varying levels of data quality. Some major credit card vendors charge customers for an automated data feed, with tiered rates where customers pay more for feeds with richer data and less for feeds with minimal data. Purchase dates often do not match travel dates, either because the vendor batches up several days worth of charges and submits them at once, or because the ticket or hotel room or rental was paid in advance. Credit card data feeds do not always contain travel dates. Sometimes the credit card data feeds contain merchant codes, but other times the credit card data feeds only contain the name of the merchant, creating confusion (e.g., are "Value Inn" and "Value Inn Express" the same merchant?). It is not always possible to know with absolute certainty that a given credit card charge matches a specific travel event. A mechanism is needed to judge the probability of any credit card data matching a given travel event request and to match the most probable credit card data feed record with the most probable travel data feed record.

Furthermore, travel data feeds also contain varying levels of data quality. Some GDS vendors have systems where all travel itinerary changes are transmitted on a data feed (e.g., the Galileo IDS system). Other travel feeds come from agencies and are limited to the data that the agency provides. In some cases, a travel record change is added to the travel data feed by having an agent manually make a selection or enter a code to add the change to the feed. This type of process is very prone to human error, so it is possible that the travel data feed may not contain the most up-to-date itinerary information.

In addition, the travel data known prior to the trip may not be representative of the trip actually taken. For example, the traveler may have a reservation at Hotel A, but may change that reservation to Hotel B if the traveler discovers that Hotel B is closer to a meeting site. A matching process that requires exact vendor match would never match the hotel reservation at Hotel A with the credit card charge at Hotel B the data feeds. However, as Hotel B was the hotel used on the trip, it would be useful to match the Hotel B credit card charge to the Hotel A reservation so that management knows that the Hotel A reservation will not be expensed in addition to the Hotel B credit card charge.

Additionally, travel vendors make "trusted" receipts available in digital form to their customers. These trusted receipts contain valuable data that is useful in the expense management process.

SUMMARY OF THE INVENTION

The present invention meets the above-identified needs, as well as others, by providing a system and method for integrating travel and expense management. The present invention enables an entity to integrate not only data that matches exactly, but also to determine the likelihood that data that does not match exactly nevertheless corresponds. In one embodiment, the method includes: retrieving travel data records corresponding to travel requests; retrieving expense data records reflecting expense transactions; comparing the expense data records to the travel data records; and determining a likelihood that the expense data records match the travel data records.

The system comprises: a network; at least one terminal coupled to the network; and at least one server coupled to the network. The server comprises a program that: retrieves travel data records corresponding to a travel request; retrieves expense data records reflecting expense transaction; compares the expense data records to the travel data records; and determines a likelihood that the expense data records match the travel data records.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

FIGS. 6 through 16 are screen shots illustrating a typical scenario experienced by a user, according to one embodiment of the present invention.

DESCRIPTION OF THE INVENTION

Overview Information

Figure 1:
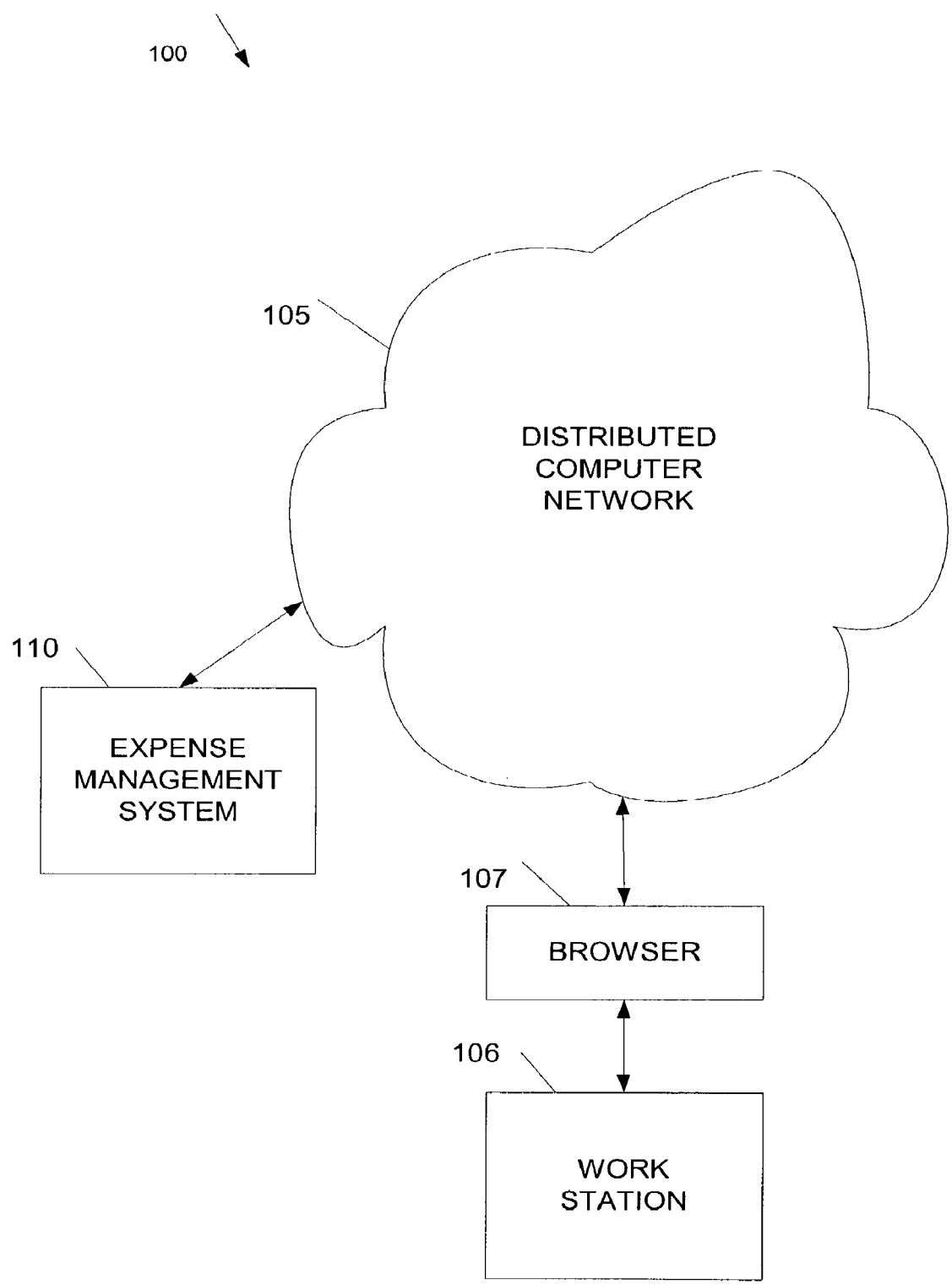
FIG. 1 illustrates the primary components of a representative operating environment, according to an embodiment of the present invention.

The present invention provides a system and method for integrating travel and expense management. In one embodiment, a user (e.g., a traveler) submits a travel request, stored as travel data. This travel request is made in multiple ways, including by using an on-line self-booking tool, by contacting a travel agent, or by contacting a travel vendor directly. The travel request is stored, for example, as a Passenger Name Record (PNR) in a travel Global Distribution System (GDS) (e.g. Sabre, Amadeus, Worldspan, or Galileo). Those skilled in the art will understand that many data storage mechanisms can be used.

In one embodiment, travel data includes a number of travel event requests, where each travel event request includes, for example, a travel event type (e.g., air, rental car, hotel, limousine, train), a travel vendor (e.g., an airline), the location or locations of travel, travel dates, and information that is specific to the given vendor and travel event type (e.g., flight number, confirmation number, rental car class, number of beds in a hotel room). This travel data is often included in travel data feeds.

Expense data is often imported from credit card feeds. This expense data typically is represented as a electronic text file that includes a list of expense transactions and corresponding detailed information, referred to as expense items.

Those skilled in the art will understand that the exact format of this file may vary and that there are many other possible methods of transmission. In one embodiment, the expense management system of the present invention imports this file and analyzes it to identify the travelers who charged each of the transactions. Some expense management systems also support the import of purchase data directly from the travel vendors themselves. Some expense management systems also import travel request data from the GDS systems or other travel management systems.

In one embodiment, the traveler pays for the travel event. The time of payment can vary from event to event on the same itinerary. For example, airline tickets are often purchased in advance, whereas hotel fees are typically paid at checkout. The present invention recognizes that the state of the travel industry is evolving, and hotel and rental car vendors often request partial or complete payment in advance of travel. The present invention also recognizes that acceptable methods of payment vary by vendor, although electronic payment by credit card is common. The credit card is, for example, a personal credit card owned by the traveler or a corporate credit card. The corporate credit cards are, for example, either issued to the traveler or centrally paid by the company (i.e., "ghost cards"). With centrally-billed cards, many travelers use the same credit card to pay for multiple travel events. Those skilled in the art will recognize that there are other methods of payment that could be used.

After paying for one or more of the travel events, the traveler submits an expense report. Expense reports serve multiple purposes, including, but not limited to: allowing the employee to be reimbursed for approved out-of-pocket expenses incurred during business travel, allowing the company to track the consumption of travel event requests that were previously reserved in order to estimate expenses that will be submitted in the future; and allowing the company to track travel event requests not reserved through the corporate travel management system.

Companies often have contracts with specific travel vendors and/or agencies, and these contracts often have minimum purchase requirements that must be met in order for the company to receive the preferred rates specified in the contracts. In addition, on-line self-booking travel tools can enforce travel policies automatically, helping companies control costs. Travelers who do not use these tools are not subject to this policy enforcement, so companies have an interest in identifying these travelers. Expense management tools often include the capability of automatically paying credit card bills for company-issued credit cards. Travelers are also often liable for expenses charged to these company-issued credit cards that are not approved by management. Thus, travelers often include expenses from company-issued credit cards on their expense reports to obtain the required approval and to automate payment. As payment for different travel events on the same travel request may occur at different times, it is entirely possible that multiple expense reports may be submitted for the same travel request.

In one embodiment, the expense management system receives all the travel and expense data and sends it to the client. The client imports the data to create an expense report, then submits the expense report and the imported travel and expense data is linked to the expense item. In another embodiment, the traveler imports unmatched travel data, imports expense data, and matches the imported expense data to an item on an "in-progress" report. The traveler then submits an expense report with the data matched.

In a further embodiment, a traveler imports unmatched travel data, submits the expense report, and then later imports expense data which either the client or server determines matches already submitted travel expense item. That expense data is then linked to the already submitted expense item or gives the traveler the option to import that separately in which case it could be flagged optionally to the manager as a possible duplicate expense.

In an additional embodiment, the traveler imports unmatched expense data, and then imports travel data and matches that data to an item on an in-progress report. The traveler then submits an expense report with the data matched.

In another embodiment, the traveler imports unmatched expense data, submits the expense report, then later imports travel data that either the client or server determines matches an already submitted expense item matched to the expense data. The new travel request data is either linked to the old report, or the traveler has option to import the travel request separately, in which case the request can be flagged optionally to the manager as a possible duplicate expense.

In a further embodiment, the traveler manually enters an expense item and then the system imports travel and/or expense data and matches that imported data to the manually entered expense, whether that expense is on an in-progress report or a previously submitted report.

Once the expense report is submitted, expense management steps are performed, such as approving the report (although this could be skipped if, for example, the expenses can be mapped to travel requests that have been approved prior to travel). The system pays expenses, reimburses the traveler, and pays the corporate card vendor. Expenses are also exported to accounting systems. Reporting may also be performed with reconciliation reports that show travel requests not expensed or expense items not requested through the travel system, and travel data and credit card data can be accessed for a transaction because that data is linked to the expense items.

System Diagram and Process Flowcharts

FIG. 1 illustrates the primary components of a representative operating environment, according to an embodiment of the present invention. An on-line environment 100 comprises: a distributed computer network 105; at least one workstation 106; at least one browser 107; and an expense management system 110.

A distributed computer network 105 is a network, such as the global Internet, that facilitates communication between one or more workstations 106, such as personal computers (PCs), minicomputers, microcomputers, main frame computers, telephone devices, or other wired or wireless devices, such as hand-held devices, one or more browsers 107 and an expense management system 110, which is housed, for example, on a server, which includes, for example, a mini-computer, a microcomputer, a PC, a mainframe computer, or other device with a processor and repository (e.g., database) or coupling to a repository.

One or more workstations 106 accept input from users, and allow users to view output from the reporting application.

One or more browsers 107 include software on the workstation 106 that let a user view, for example, HyperText Markup Language (HTML) documents and access files and software related to those documents. The present invention utilizes, for example, HTML-based systems, Java-based systems, XML-based systems and systems where a custom-built application communicates over the network.

The expense management system 110 is an application that works on or with a browser to display information to the user. The details of the expense management system 110 are set out in FIG. 2.

Figure 2:
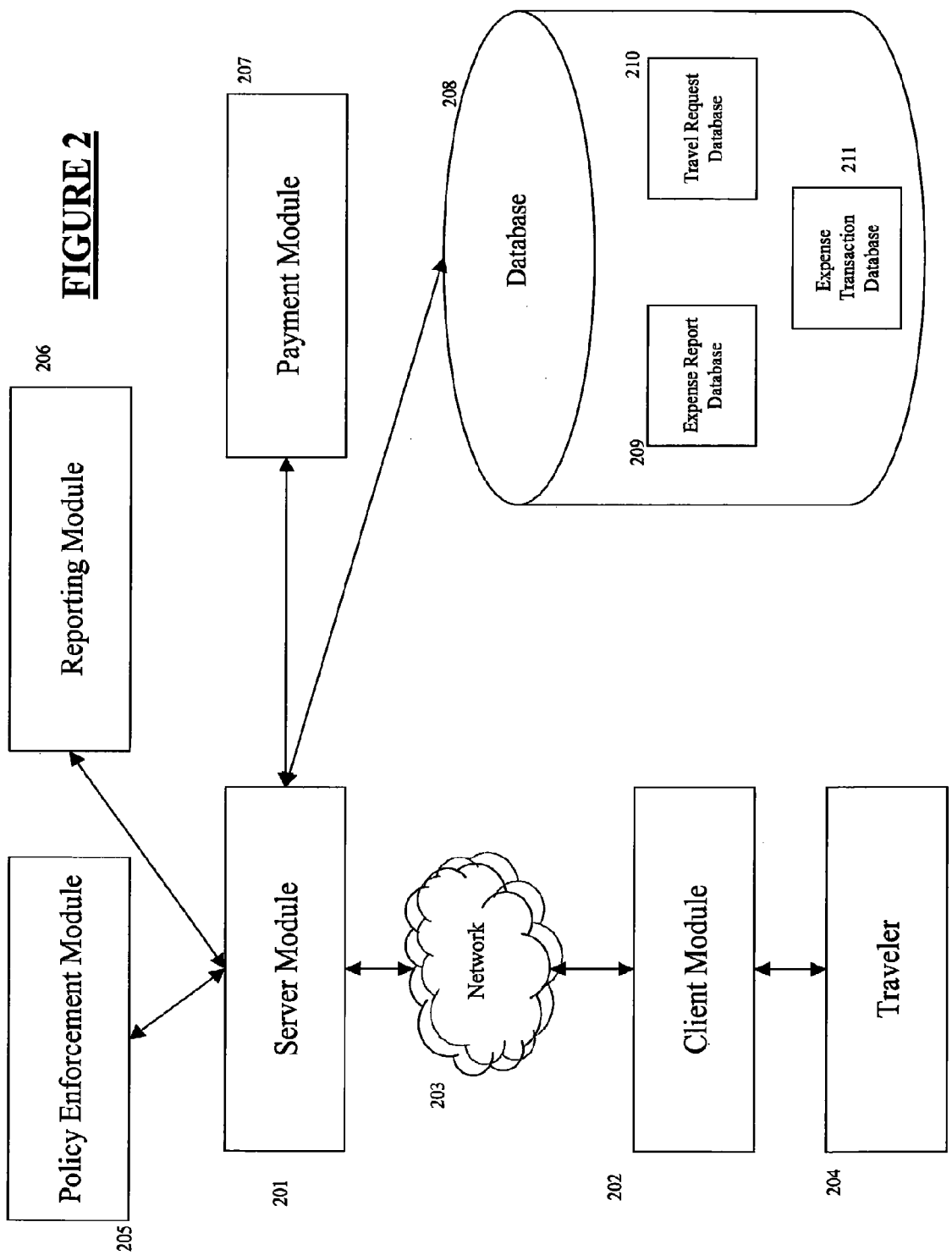
FIG. 2 is a system diagram illustrating an expense management system, according to one embodiment of the present invention.

FIG. 2 is a system diagram illustrating an expense management system 110 of FIG. 1, according to one embodiment of the present invention. The expense management system includes a server module 201 and a client module 202 connected by a network 203. A traveler 204 uses the client module to create and submit expense reports. In this embodiment, the client module is connected to the server module to submit expense reports or download travel data or credit card data. The server module transmits data to the client (e.g., corporate policy data, data accumulated from various travel and expense data sources). Those experienced in the art will recognize that many other models can be used to build the expense management system. Those experienced in the art will also understand that while an expense report is in-progress, the data for the expense report can stored on the client module, the server module, or both modules. Likewise, when the server module transmits travel and expense data to the client module, the server module annotates that data with extra information not received from the original data sources. For example, the server module may determine or receive indication that charges from a certain vendor are of a certain type based on either domain information (e.g., charges from "Hilton" are typically hotel room charges) or information gleaned from previous uses of the system (e.g., a particular traveler has previously submitted charges from "Macaroni Grill" that were meals, so future charges from "Macaroni Grill" will likely be for meals). When an expense report is submitted, the data for the expense report is sent to the server. The expense report is comprised of individual expense items, and each item can be matched to zero or more travel event requests or zero or more expense transactions. The expense management stores the expense report in a repository 208. In one embodiment, i.e., the repository is comprised of an expense report database 209, a travel request database 210, and an expense transaction database 211. The system uses these three databases 209, 210, and 211 to track which travel event requests and which expense transactions match a given expense item. The server module 201 optionally then transmits the data to a policy enforcement module 205, a reporting module 206, or a payment module 207. Those experienced in the art will recognize that expense management systems can contain any number of modules that receive expense data.

The travel request database 210 comprises data received by using some combination of multiple sources (e.g., an on-line booking tool, a travel agent, contact with a travel vendor). The travel request data from these sources is assembled and stored in the travel request database, typically as a Passenger Name Record (PNR).

The expense transaction database 211 comprises expense data received from multiple sources. The payer (e.g., the traveler), pays the travel agency or travel vendor with, for example, a credit card. The record of this transaction goes to the credit card vendor, which transmits funds to the travel vendor for the amount purchased.

The expense management system 110 receives travel data from a travel system, expense transaction data from a credit card vendor, and purchasing data from a travel vendor. For a given expense, data may be present from any number of sources, including the possibility that no data is present. The expense management system receives data from different sources at different times and different rates. A source could transmit data continuously or near-continuously (e.g., once per hour), daily, weekly, or even monthly or at longer intervals. The expense management system stores all the data received from all the sources when the information is received. The expense management system identifies the traveler corresponding to a given travel request or expense data. Expense data often comes encoded with a credit card number that has been assigned to a specific person. For central billed cards, other traveler-identifying information is often included. In an alternate embodiment, if a traveler uses an on-line self-booking tool to make a travel request, an identification of the user making the request (or user on whose behalf the request is made) is stored at the time of request, and the record locator from the PNR is also stored. Travel data identified by this specific record locator is mapped to a specific traveler. Information about a traveler is embedded into the remarks section of the PNR by the travel agency, or the passenger's name is read from the PNR. Similar methods can be used to identify the traveler on data transmitted directly from a travel vendor. Additionally other uniquely identifying information, such as frequent traveler numbers, can be used.

Figure 3:
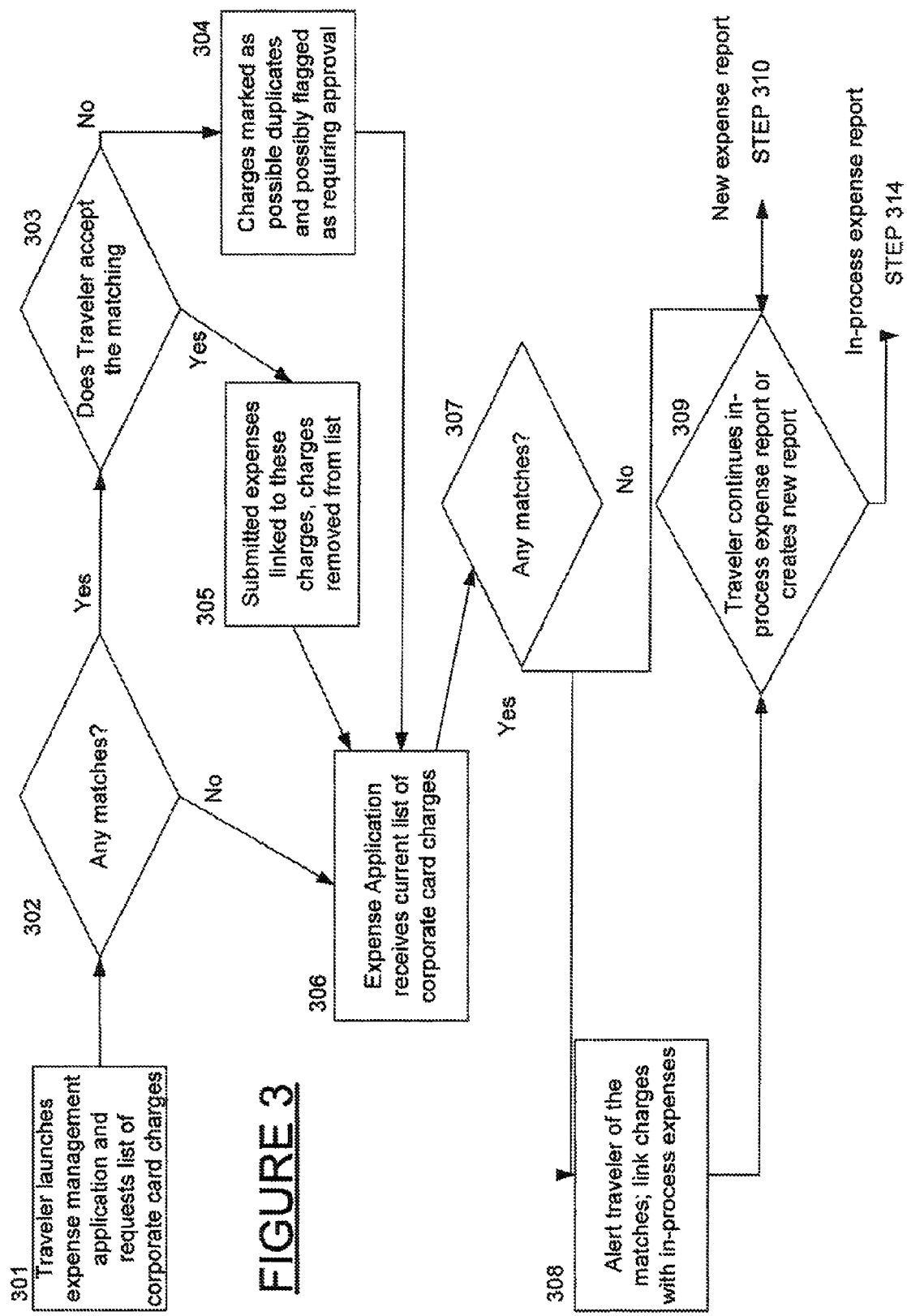
FIGS. 3 and 4 are flowcharts illustrating a matching scenario, according to an embodiment of the present invention.
Figure 4:
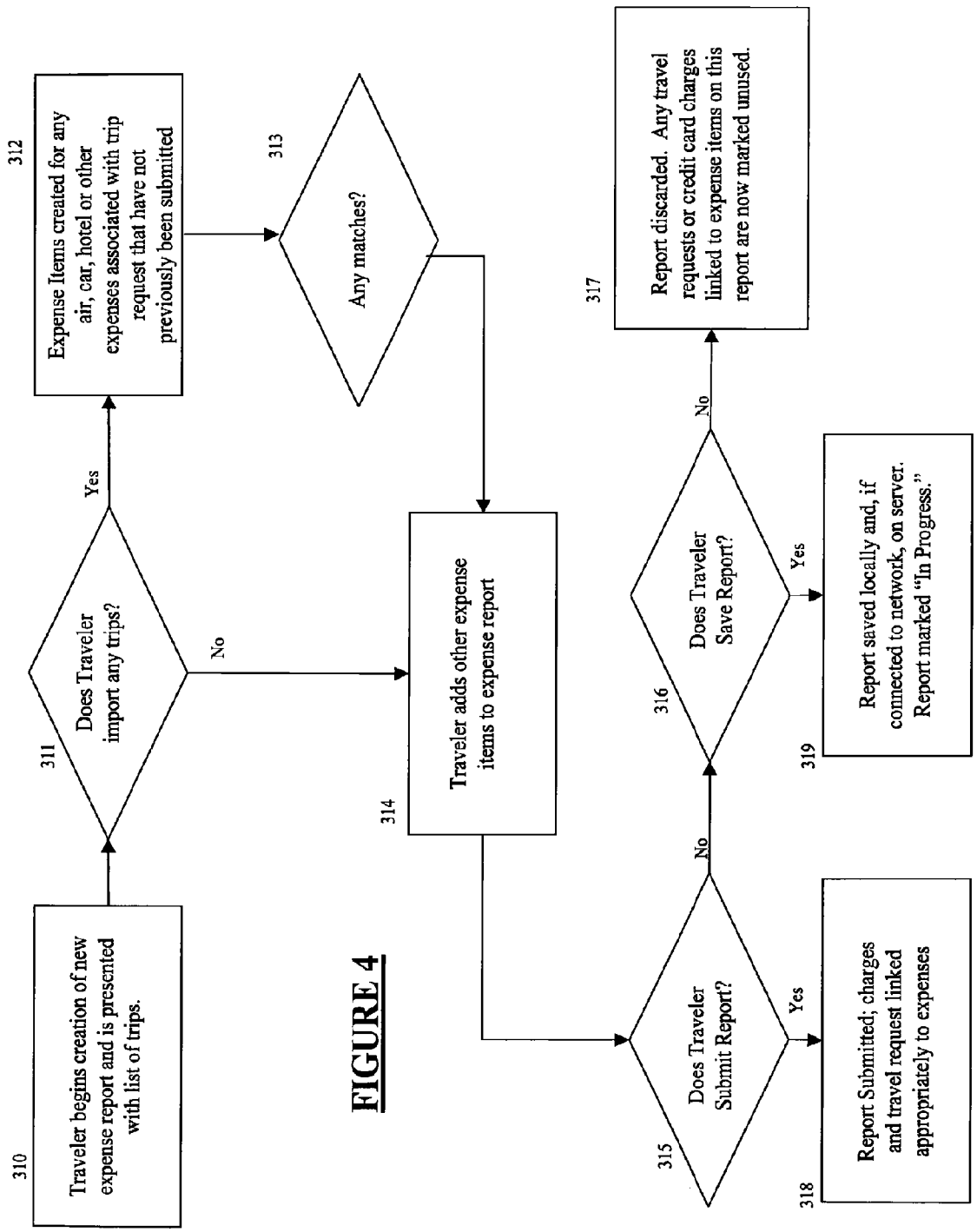

FIGS. 3 and 4 preset a flowchart illustrating a matching scenario, according to one embodiment of the present invention. In 301, the traveler begins a session in the expense management application. At application launch, if the computer running the application is connected to a network, a request is transmitted to the expense management server to retrieve any new corporate card charges that have been received since the last such request by this traveler. In 302, the expense management server determines whether there are any matches. The expense management server does this by comparing the list of new corporate card charges to expenses on reports already submitted by this traveler. If no matches are found, the process continues to 306. If yes, some charges match previously submitted expenses, the traveler is notified in 303 and given the choice of accepting the matches or proceeding without matching. If no, the traveler elects not to accept the matches, in 304 the charges that the system determined to be matches are marked as possible duplicate expenses. Depending on company policy, any future expense report that contains one or more of these charges could require additional approval. If yes, the traveler elected to accept the matches, in 305 the previously submitted expenses are linked to these charges, and the charges are removed from the list of newly available credit card charges that are transmitted to the client.

In 306, the expense management application receives the list of new charges from the server. In 307, these charges are compared to any expense reports that are currently in-progress to determine if any new charges match in-progress expenses. If no matches occurred, the process proceeds to 309. If yes, some charges match in-process expenses, the traveler is notified in 308, and the user proceeds to 309. In 309, the system determines whether an in-process expense reports is used, or a new expense report is created.

If an in-process report is used, the process proceeds to 314. If a new expense report is created, the process proceeds to 310, where the traveler begins creation of a new expense report. In 311, the traveler is presented with a list of trips available for import. If the expense management application is currently connected to the expense management server by network, then the list of trips can be refreshed from the server, otherwise the list is current as of the last time the application requested the list of trips from the server. If the traveler chooses to import one or more trips then, in 312, expense items are added to the expense report corresponding to any air, car, hotel, train, limousine, parking, taxi, or other items on the travel request for this trip. In 313, the current list of credit card charges is compared to each newly created expense item. As in 311, if the expense management application is currently connected to the expense management server by network, then the list of credit card charges may optionally be downloaded from the server. Otherwise, the list of charges is current as of the last time the application requested the list of credit card charges from the server.

In 314, the traveler optionally adds other expense items to the expense report. These items can be added manually or by adding other credit card charges as expenses. Although it is not shown in the flowchart, the traveler has the option in 314 of adding additional trips to the existing report by returning to 311. When the traveler is ready to end the session in 315, the traveler can elect to submit the expense report. This step requires a network connection to the expense management server. If such network connection is not present then this option is not presented to the traveler. If the traveler elects to submit the expense report, then in 318, the new expense report is transmitted to the expense management server as a submitted report. Depending on company policy, various compliance checks can be run and these optionally may return the report to the traveler as not able to be submitted in which case the traveler returns to 314, where corrections can be made.

If the server accepts the report then applicable expense items are linked to credit card charges and/or travel even requests. If the traveler does not wish to submit the report then the traveler can elect to save the expense report or discard it. If the report is saved, then in 319 the data is saved to the local computer and, if there is a network connection to the expense management server, a copy is saved to the server and marked as "in-progress." This latter step allows the user to change computers in the future and still continue work on in-progress reports. If the user elects neither to submit nor save the report, then the report is discarded in 317. Any credit card charges or travel event requests that were linked to items on this report are marked as unused and are available for import into future expense reports.

Figure 5:
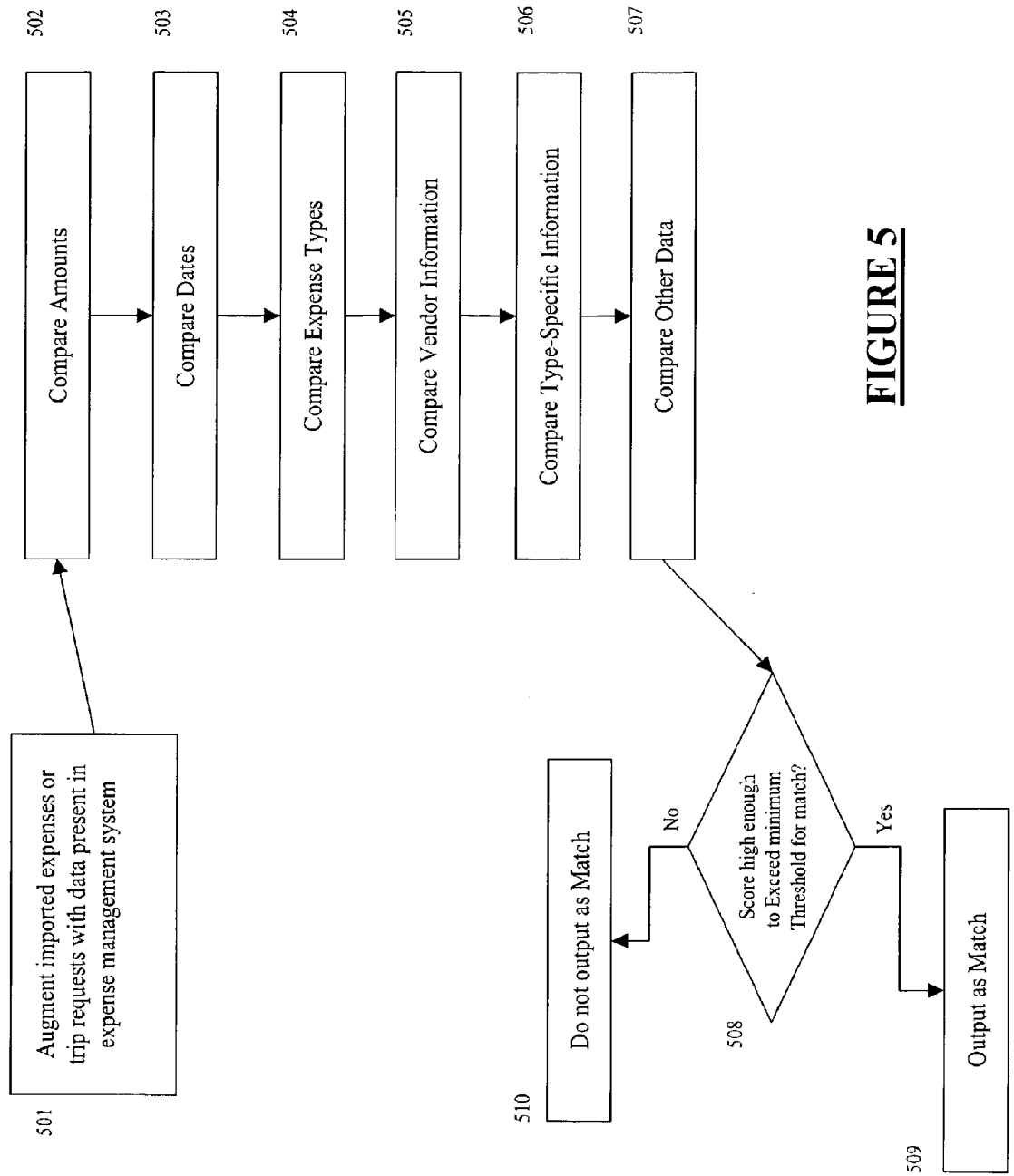
FIG. 5 is a flowchart illustrating matching of travel data and expense data, as performed in FIG. 3, according to an embodiment of the present invention.

FIG. 5 is a flowchart illustrating matching of travel data and expense data, as performed in steps 302, 307, and 331 of FIGS. 3 and 4, according to an embodiment of the present invention. This matching can occur on the expense management server or the expense management client, or both, depending on the embodiment of the expense management system and the specific circumstance. The matching can be performed on the expense management server, as well as on the expense management client. The matching system processes the travel and expense data and attempts to identify travel event requests that match expense transactions. The matching subsystem uses a matching program to identify the likelihood of an expense transaction matching a travel event request. If the most likely match is above a threshold, then the request is deemed to match the given expense transaction. One embodiment of a matching program assigns a numerical score to each combination of travel event request and expense transaction. A match where both the travel event request and the expense transaction have the same vendor and the same rate for the same travel dates scores very highly. A match where the vendor matched, the dates were overlapping but not identical, and the amount was close but not exact receives a lower score. Exact matches on different attributes receive different scores, close matches receive lower scores, and mismatches receive no score or a negative score.

The matching subsystem then outputs the matches, and outputs travel event requests and expense transactions that were not deemed to be matches but had scores that were close to the highest score or scores above a threshold. These non-matches could be used, for example, to present alternatives to the traveler if the traveler claims that the match outputted by the matching subsystem was not accurate. Those skilled in the art will recognize that there are virtually a limitless number of potential methods for matching information using various attributes of the expense transaction data, travel request data, other domain information, and past history of this or other travelers.

In the embodiment of FIG. 5, the matching process occurs on the server if all information is present on the server or on the client if information from the client is needed or if performance justifies it. One of the expenses comes from a travel event request and the second comes from a credit card charge or a vendor receipt. However this matching program could also be used to match, for example, a credit card charge to an expense item that was manually keyed in by a traveler, so long as sufficient data has been provided by the traveler. For the purposes of this discussion, it will be assumed that a travel event request is being matched to a credit card charge, although a practitioner of the art would recognize that the term "travel event request" could be replaced with "expense one" and "credit card charge" could be replaced with "expense two" to make this discussion more general.

In 501, the raw data from the travel request and the credit card charges are augmented with information from the expense management system. This extra information is typically derived from knowledge about the traveler or about the traveler's past expenses. This information is readily obtainable inside the expense management application, but not available to or not present in the data from the providers of the travel and credit card feeds. For example, a credit card feed may not contain expense type information (e.g., it may not distinguish between air, car, hotel, or other charges). This is typically the case when importing credit card charges from a personal card but this occurs on some corporate card imports as well. A charge comes in with a description of "United Airlines." The expense management system can look at past expenses and see that previously when expenses have been submitted and linked to credit card charges with a description of "United Airlines," that expense has been an airfare expense. The expense management system then deduces that there is a high likelihood of this expense also being an airfare expense.

502 through 508 involve comparisons of the travel event request in this example to all available credit card charges each in turn. Depending on the results of any given comparison, the matching between the travel event request and a specific credit card charge receives an increase or decrease or no change in score. In 509, the matching between travel event request and credit card charge with the highest score is compared to a threshold. If the score is above the threshold, then the travel event request is deemed to match the credit card charge in 510, and that information is used by the expense management system. If the score is not above the threshold, then the travel event request is deemed to have no matches in 511 and that information is used by the expense management system.

In 502, the amounts on the travel event request and the credit card charge are compared. If the amounts match exactly then one score is given. If the amounts are close e.g., (within a defined threshold either percentage or constant amount), then a lesser score is given, and if they are not close, then a still lesser score is given.

In 503, the dates on the travel event request and the credit card charge are compared. On some travel event requests there are multiple dates—e.g., the date of the reservation and/or the dates of travel. Likewise on some credit card charges there are multiple dates—e.g., the date the expense was incurred and the dates of travel. Whatever dates are available are used in this computation. For scoring purposes, exact matches get the highest score. If the travel dates on one are wholly included in the travel dates on the other, a lesser score is given. An example of this would be a travel request stating a hotel was to reserved the $11^{th}$ through the $13^{th}$ of the month, but the credit card charge states that it covers a hotel reservation from the $11^{th}$ through the $12^{th}$ (the traveler left one day early). If the travel dates overlap but are not wholly included then a still lesser score is given. If the travel dates do not overlap but are close or the expense dates do not match but are close (within a threshold), then a still lesser score is given, and if the travel dates do not match at all then a still lesser score is given. Practitioners of the art would realize that different embodiments could assign the same scores to categories where this embodiment chooses to assign a lesser score (for example wholly included travel dates could score the same as overlapping travel dates).

In 504, the expense types are compared. Each travel event request is labeled as being air, car, hotel, limousine, travel agent fee, etc. Many credit card charges come with some expense type information. For others the expense type information can be deduced in 501 as previously discussed. As in previous steps, matches are scored higher than mismatches.

In 505, vendor information is compared. Travel event request and credit card charges often have vendor codes, typically two-character alphanumeric strings, that identify a vendor such as United or Hertz. If present then the vendor codes are used. If not, then a string-based comparison of the vendor name is made. One embodiment of string comparison involves finding the closest known vendor to the vendor name on both the credit card charge and the travel event request. Another embodiment would be to determine if the name on the credit card charge matches the travel event request, or if the first n characters for some integer n match.

In 506, expense-type-specific information is compared. For example, with air tickets, the ticket numbers on the travel event request and the credit card charge are compared. Other information is used for other expense types if that information is available.

In 507, any other data that is present on both of the items being compared can be examined.

Those skilled in the art will realize that the ordering of the steps in FIGS. 3-5 can be altered in other embodiments and that various steps can be removed.

Screen Shots

FIGS. 6 through 16 are screen shots illustrating a typical scenario experienced by a user, according to one embodiment of the present invention.

Figure 6:
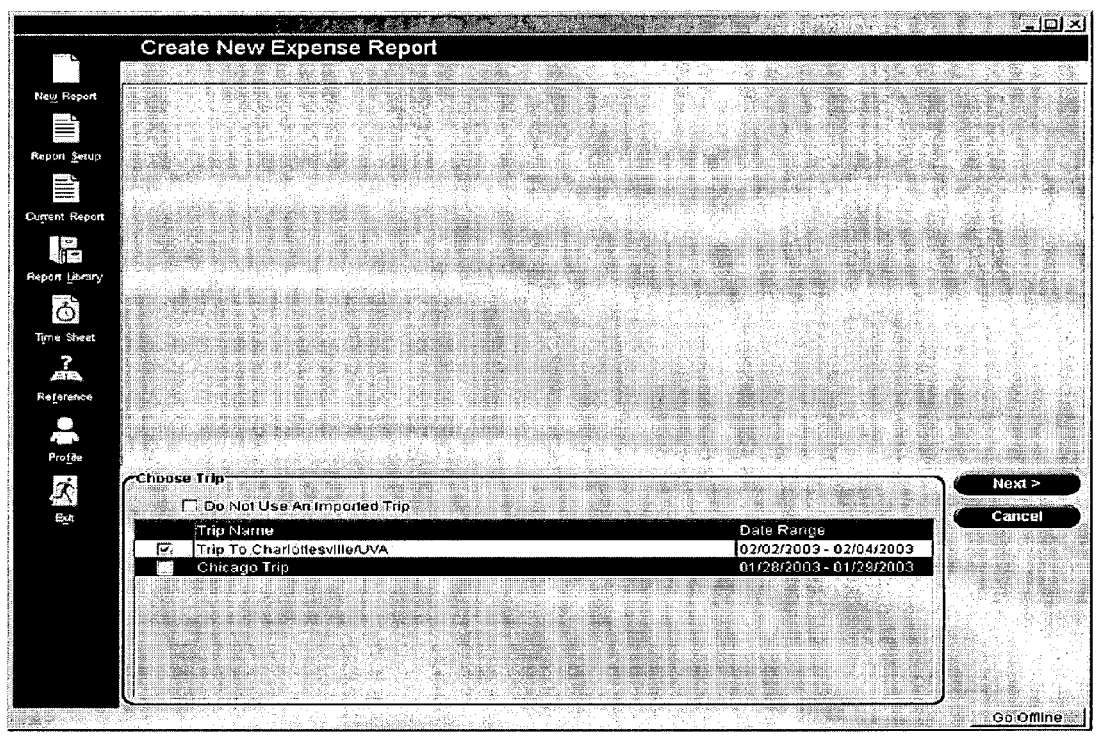

In FIG. 6, a user (e.g., traveler) is on an airplane returning from a trip to Charlottesville. The traveler is not connected to a computer network. However the travel reservation data was stored locally on the traveler's computer the last time the traveler was connected to the network. The traveler sees two trips that can be imported and chooses to import the trip to Charlottesville.

Figure 7:
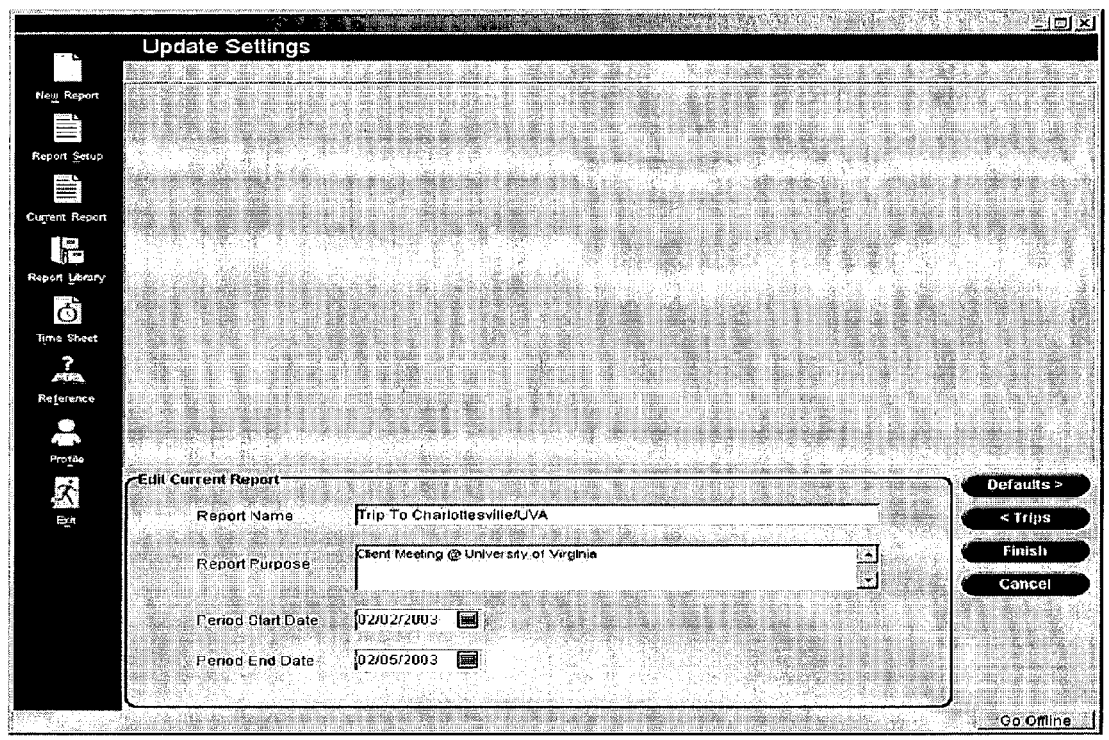

In FIG. 7, the report name and date defaults are populated from information known about the trip. The report purpose is keyed in by the traveler. This particular trip was scheduled to run from Feb. 2 through 5, 2003. The traveler had purchased an airline ticket on American Airlines and made a hotel reservation at the Sheraton. The traveler planned to get from the airport to the hotel by hailing a taxi. However, the traveler's plans changed. When the traveler arrived at the airport, he spontaneously decided to rent a car. This rental car was not be reflected in the travel data feed. Additionally, the traveler realized that a Days Inn was closer to the meeting site than the Sheraton, so the traveler canceled his reservation at the Sheraton, and made a new reservation at the Days Inn. He contacted the hotels directly so this change was not present in the travel data feed. In addition, the meeting ended one day earlier than expected, and the traveler chose to depart on the $4^{th}$, one day sooner than expected. None of these changes were made through his travel agency, so these changes would not appear on his agency's travel data feed.

Figure 8:
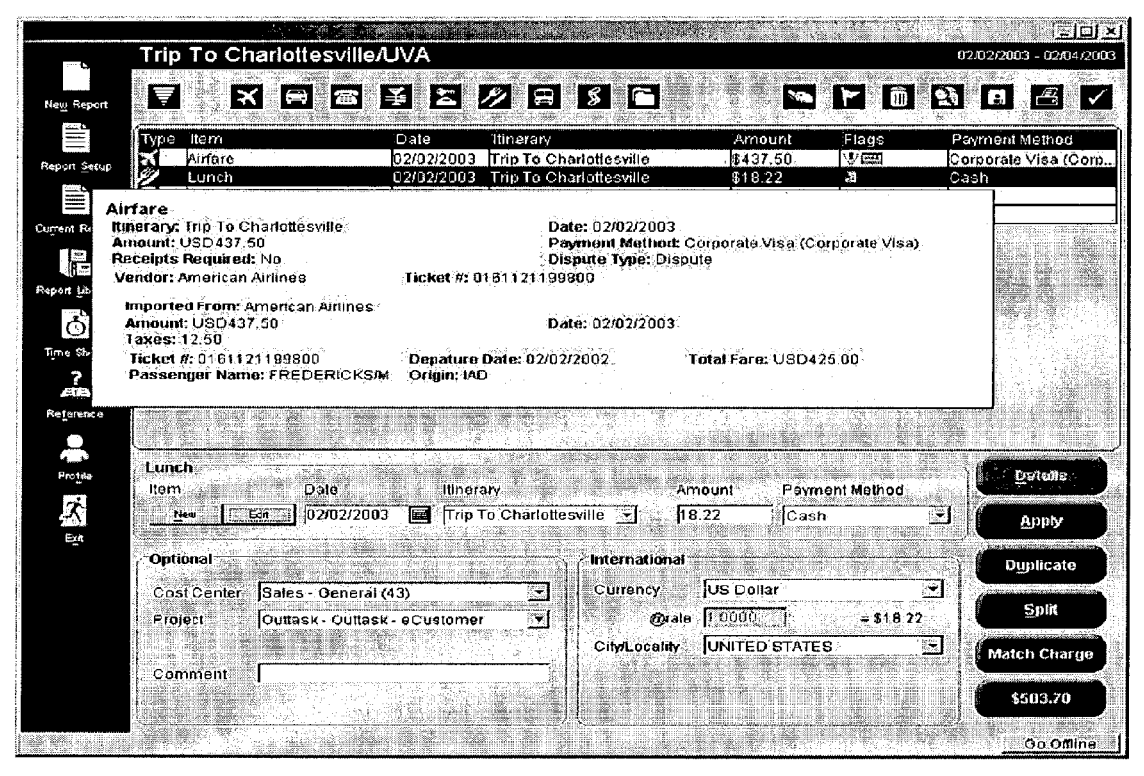

After the trip to Charlottesville has been chosen, the traveler advances to FIG. 8, where the traveler completes an expense report. The air ticket was purchased in advance on a corporate credit card, and that information was stored on the traveler's laptop. The expense management system was thus able to match the air ticket reservation from the travel data feed with the corporate charge on the credit card data feed. The traveler is able to view all information known about this expense item in one unified screen.

Figure 9:
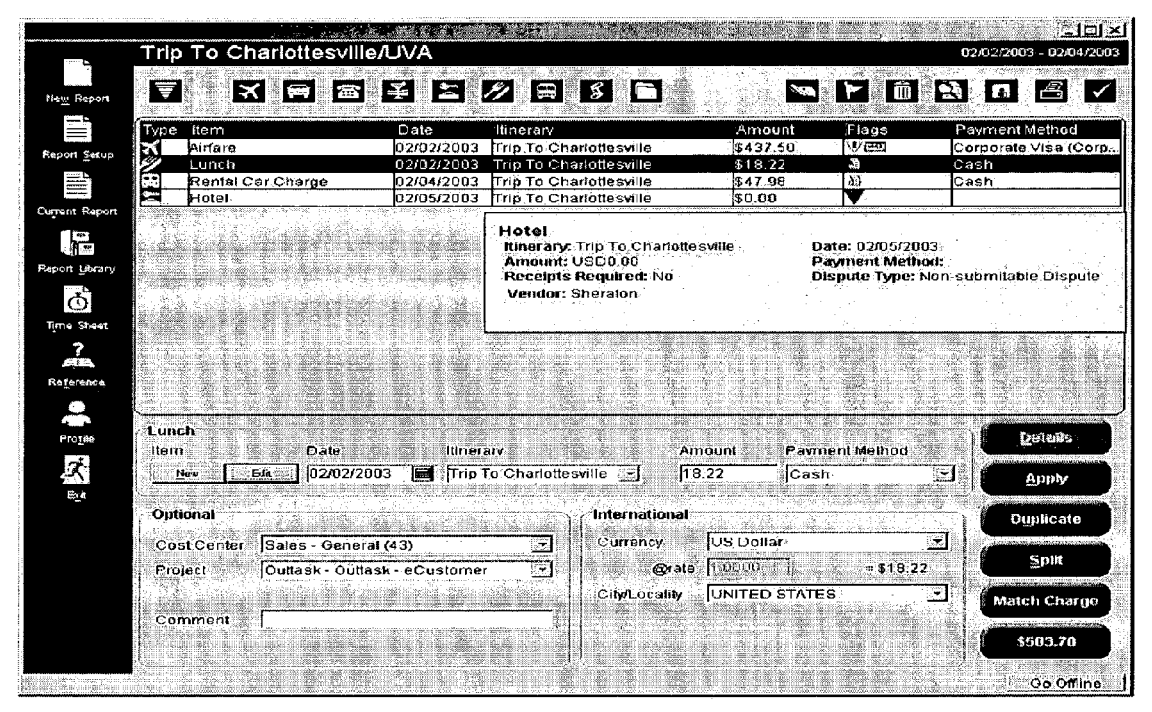

In FIG. 9, the information about the imported hotel is shown. The travel data feed had the original Sheraton reservation with a check-out date of February $5^{th}$. The traveler manually keyed in his rental car charge and a lunch paid by cash. The traveler saves the expense report and exits the application.

At a later time, the traveler completes his expense report. His computer is now connected to the network, and current corporate card charges from the credit card data feed are downloaded. The expense management application automatically compares the new charges downloaded with the expense report in-progress and alerts the traveler that two matches have been found.

Figure 10:
Figure 11:
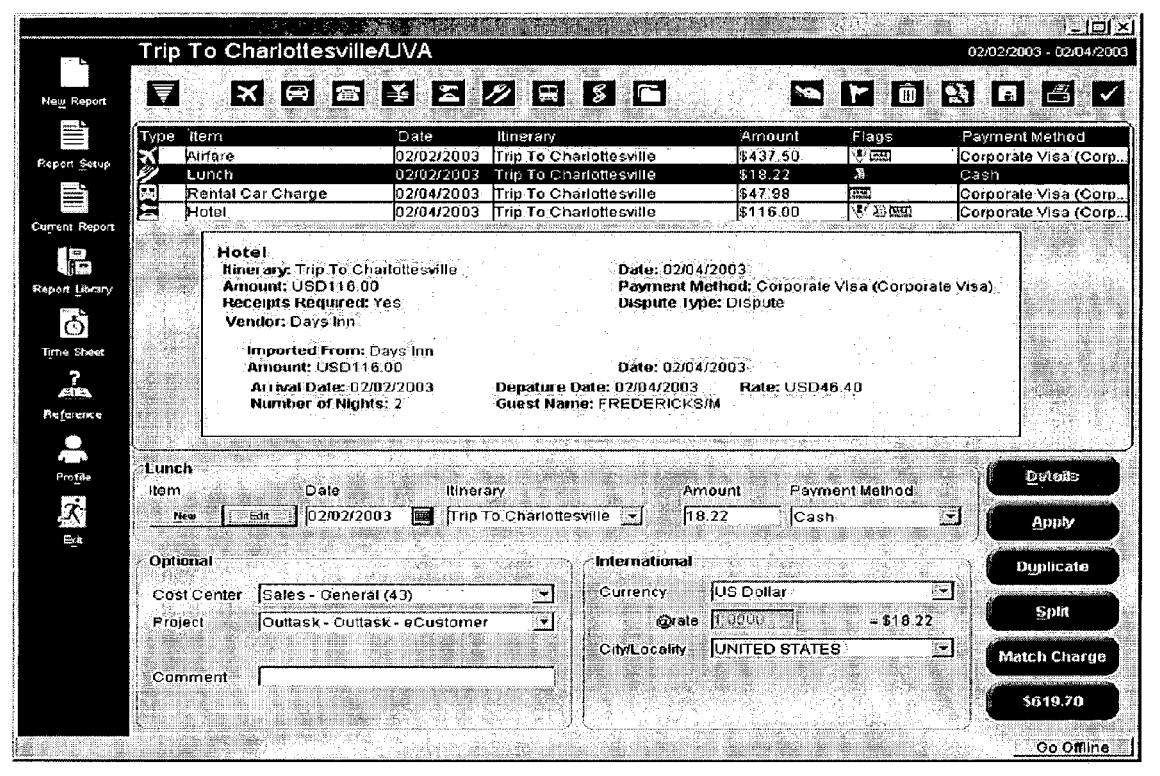

After selecting on the OK button in FIG. 10, the traveler proceeds to FIG. 11. The hotel expense, date has changed from a reservation at the Sheraton with check-out of February $5^{th}$ to the actual reservation at the Days Inn with a check-out on the $4^{th}$. Likewise, the rental car charge that was previously keyed in as an out-of-pocket expense is matched with the rental car charge downloaded from the credit card data feed.

Figure 12:
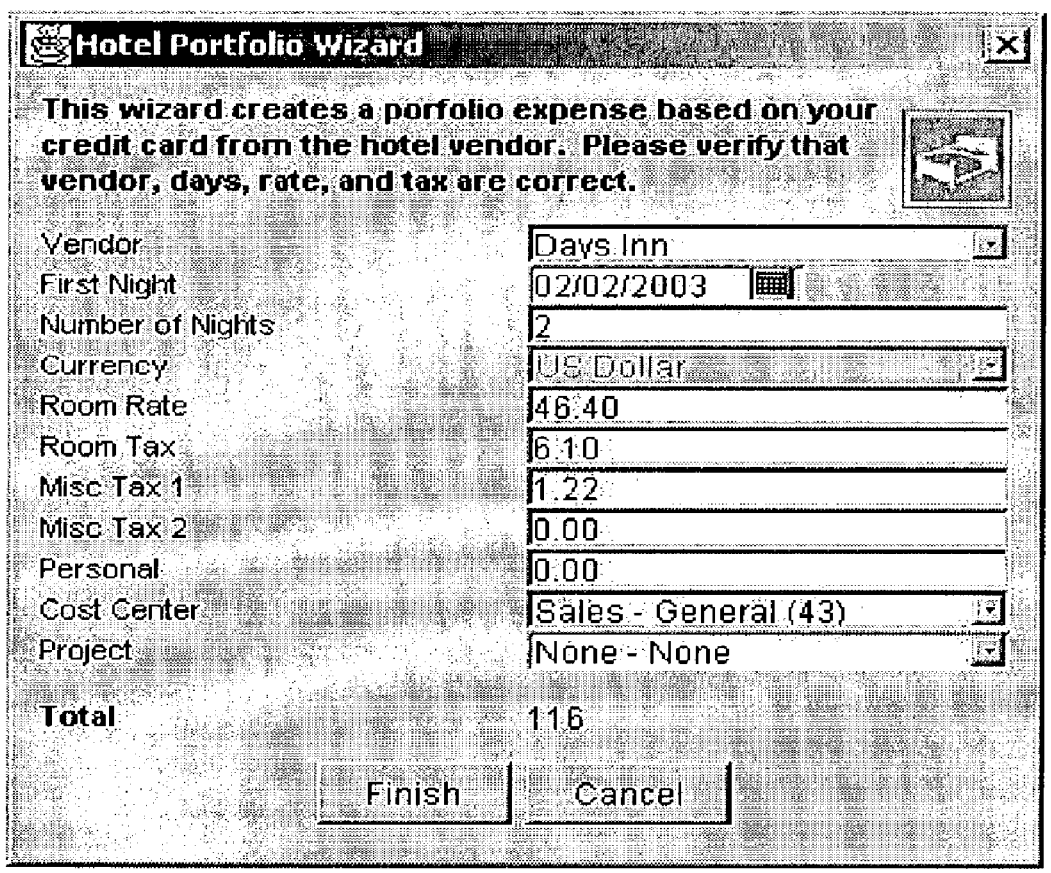
Figure 13:
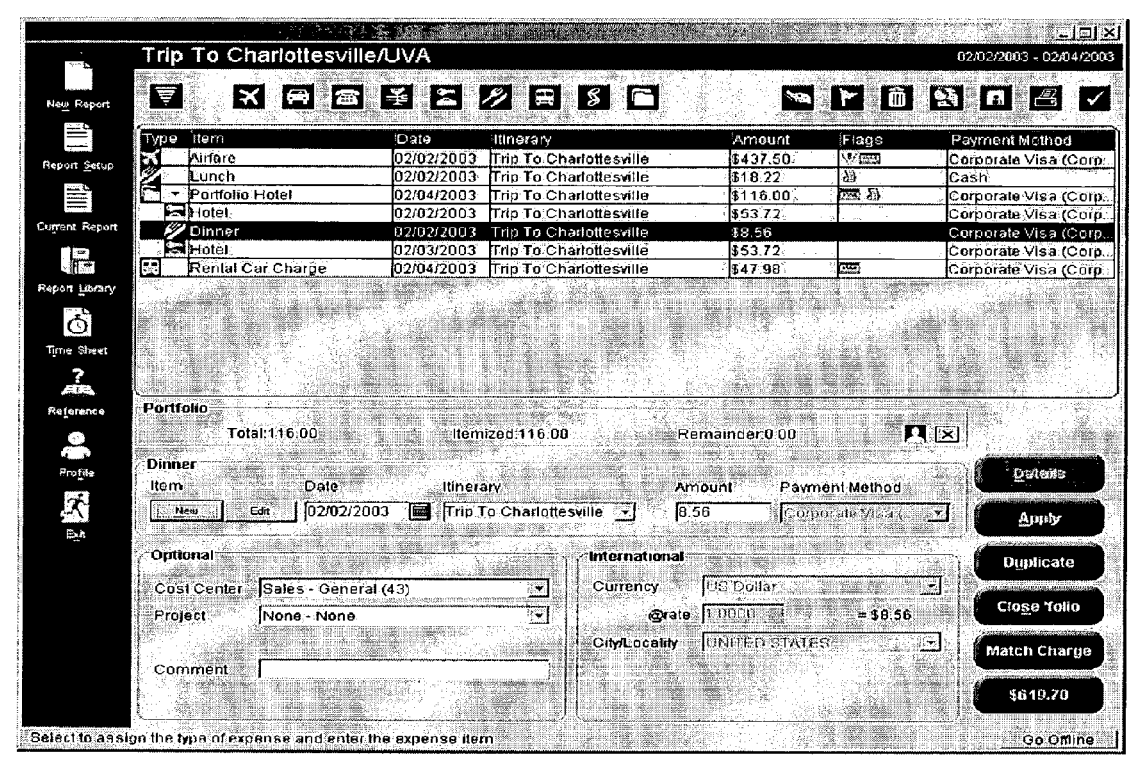
Figure 14:
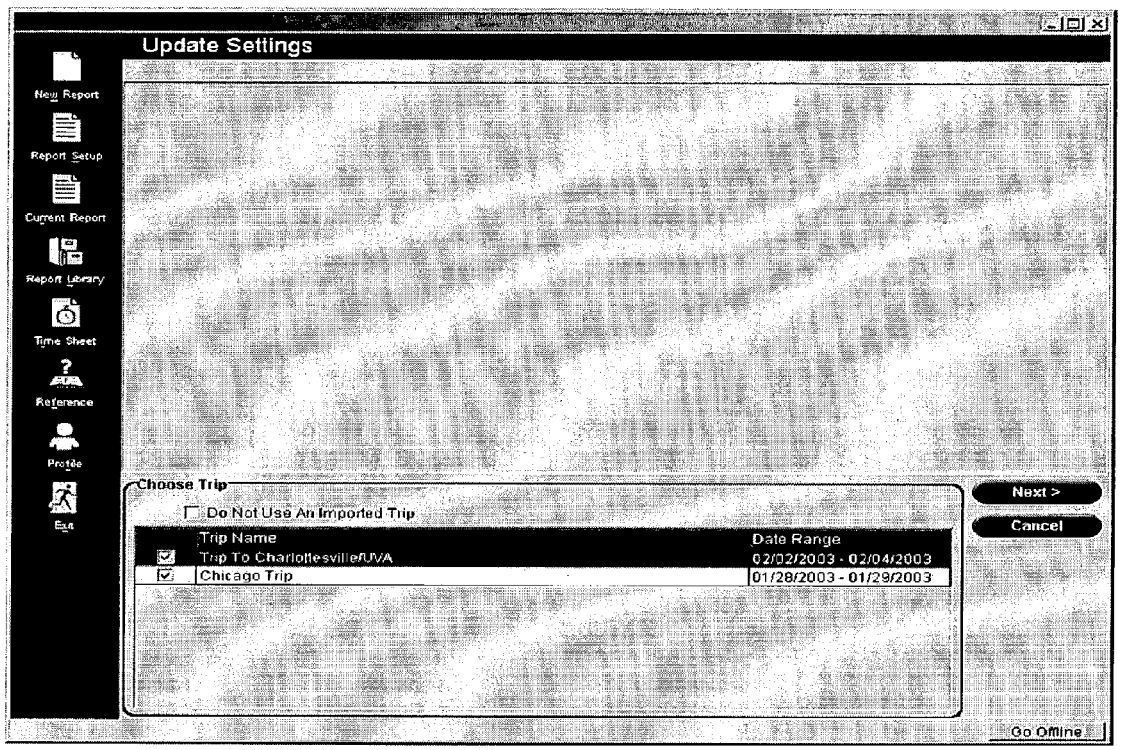
Figure 15:
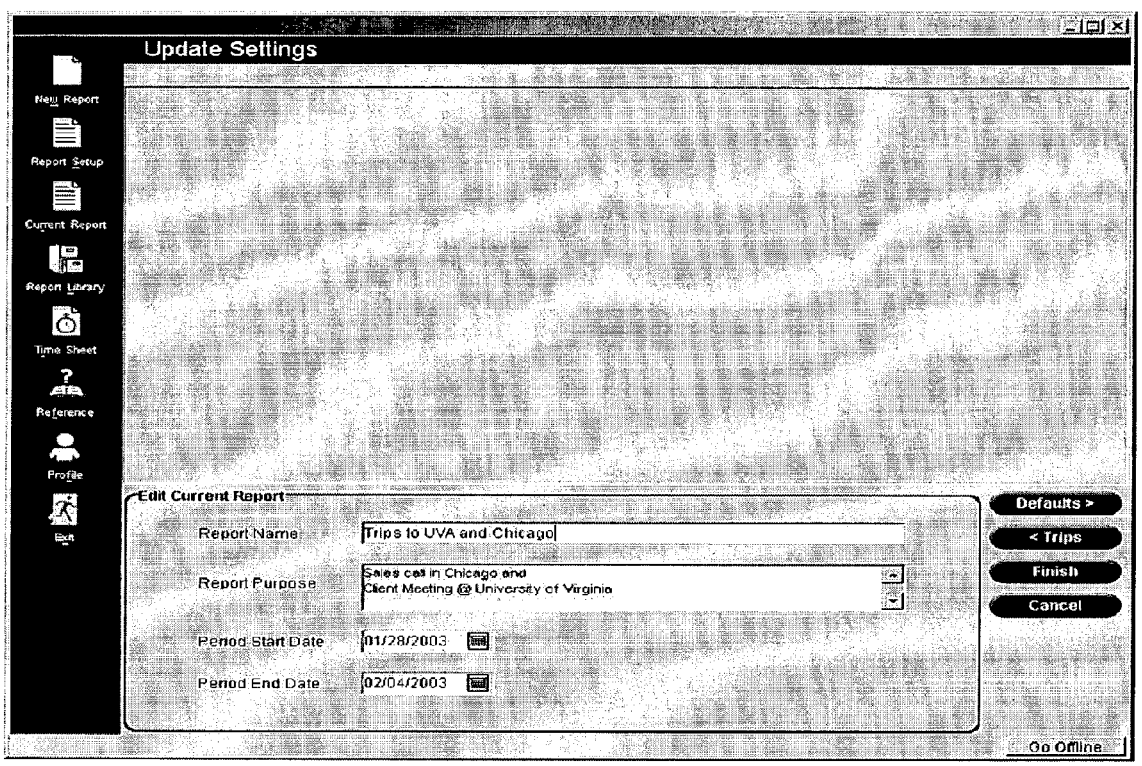

In FIG. 12, the traveler itemizes the hotel into a portfolio, including part of all of the following information: the first night and number of nights, the currency and the room rate. This information can be imported from the credit card data feed. The traveler enters the tax amounts and clicks "finish." The traveler then proceeds to FIG. 13, and adds a dinner purchased via room service that was charged to his hotel room to complete the itemization of the hotel receipt.

Figure 16:
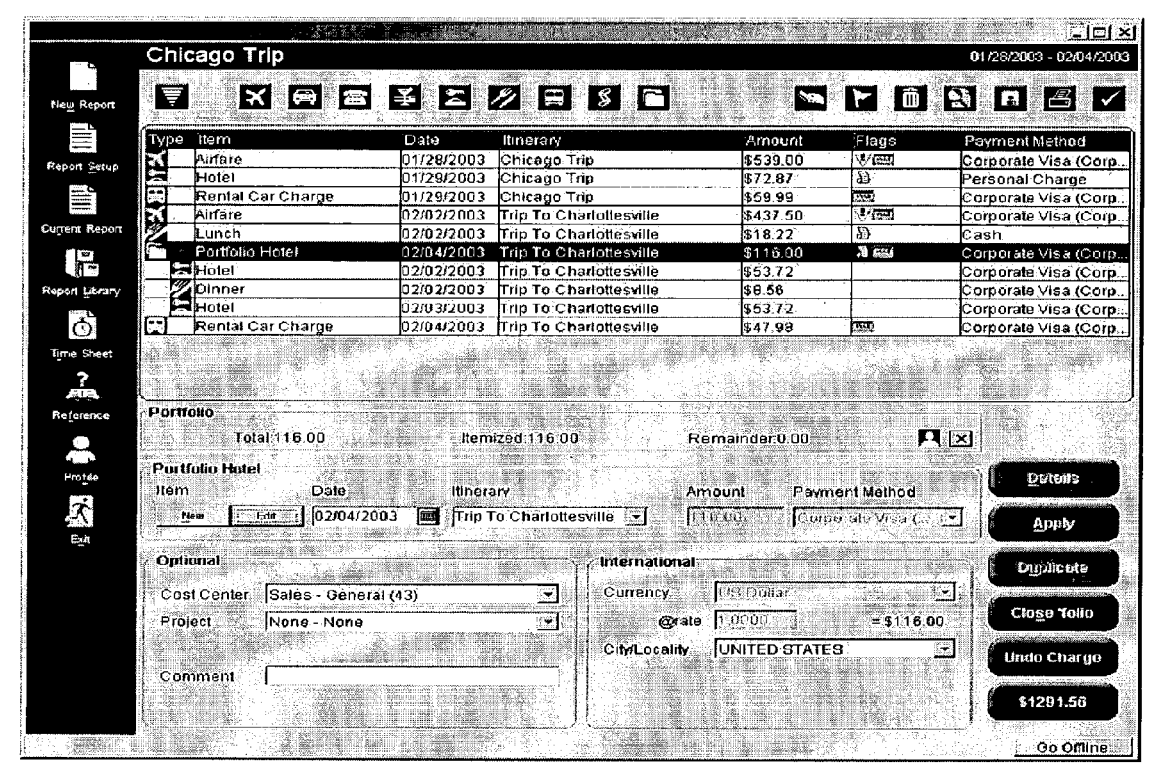

At this point the traveler decided to add a previous trip to Chicago onto the existing expense report. He proceeds to FIG. 14, where he selects the "Chicago Trip", and then in FIG. 15, the date range of the report is automatically updated. The traveler updates the name of the expense report and the purpose to reflect the additional trip and then imports the report. The air and car reservations from the travel request are matched to corporate card charges but in this case the traveler paid for the hotel with his personal card. The traveler imports his personal card charges using a file provided by his bank and the application recognizes that the hotel charge was on that feed. The final expense report is shown in FIG. 16. At this point the traveler can submit the report. Depending on company policy, the expense report could require manager review or be routed straight for payment. In the expense database, the information for the applicable credit card charges and travel expenses is linked to the appropriate expense items from this expense report.

Example embodiments of the present invention have now been described in accordance with the above advantages. It will be appreciated that these examples are merely illustrative of the invention. Many variations and modifications will be apparent to those skilled in the art.

What is claimed is:

1. A computerized method for integrating travel and expense information, comprising:
   receiving, by a server module, travel request data and/or travel reservation data corresponding to a travel event type, the request and/or reservation data further including travel request and/or reservation attributes;
   generating, by the server module, a travel request record, wherein the travel record includes the travel request and/or travel reservation information;
   receiving from a plurality of sources, by the server module, travel expense transaction data, the travel expense transaction data further comprising an expense transaction attribute;
   generating, by the server module, a travel expense transaction record, wherein the travel expense transaction record comprises the expense transaction data;
   designating, by a matching module, an attribute included in the expense transaction record for comparison to a corresponding attribute included in the travel request record;
   retrieving, by the matching module, pre-determined matching criteria corresponding to the travel event type and to the designated expense transaction attribute;
   comparing, by the matching module, the expense transaction attribute to any corresponding request attribute using the pre-determined matching criteria and determining an initial matching score based on the comparison;
   iteratively repeating the comparisons for each attribute included in the expense transaction record and the travel request record to produce an adjusted matching score;
   determining, by the matching module, whether the total matching score exceeds a first pre-determined threshold defined by the pre-determined matching criteria for the travel event type and the travel request attribute;
   designating, by the matching module, the expense transaction record and the travel request record as a positive match when the total matching score is above the first threshold;
   determining, by the matching module, whether the total matching score does not exceed the first pre-determined threshold defined by the pre-determined matching criteria for the travel event type, but does exceed a second pre-determined threshold, the second pre-determined threshold also defined by the pre-determined matching criteria for the travel event type; and
   designating, by the matching module, the expense transaction record and the travel request record as a possible match when the total matching score does not exceed the first pre-determined threshold but is above the second threshold.

2. The method of claim 1, wherein the travel expense transaction data comprises: merchant information; purchase date information; date of travel information; cost information; a travel event type; credit card data; transaction data obtained directly from a travel vendor; trusted receipts obtained directly from a travel vendor; or data manually entered into an expense reporting application; or any combination thereof.

3. The method of claim 1, wherein the travel event type comprises: air travel; rental transportation; limousine service; a travel agent feed; hotel; train service; or any combination thereof.

4. The method of claim 1, further comprising: identifying, by the server module, a purchaser who generated the expense receipt record.

5. The method of claim 4, wherein the identifying the purchaser comprises: reading personal identification information from the travel expense transaction data; matching credit card information contained in the travel expense transaction data to a database associating credit card information with individual purchasers; or matching frequent traveler account information contained in the travel expense transaction data to a database associating frequent traveler account information with individual travelers; or any combination thereof.

6. The method of claim 1, wherein the travel request data and/or the travel reservation data and/or the travel expense transaction data is limited to a specific traveler.

7. The method of claim 1, wherein an entity is able to track: consumption of travel data requests in order to estimate expenses that will be submitted in the future; travel request records not reserved through an entity's travel management system; compliance of outside entities to contractual agreements; compliance of travel policies of employees; duplicate submission of one expense; duplicate payment of one expense; or appropriate amount of travel costs; or any combination thereof.

8. The method of claim 1, wherein the travel request record and/or the travel expense transaction record can be provided manually and/or electronically.

9. The method of claim 1, further comprising: receiving, by the server module, additional travel expense transaction data including expense attributes; comparing, by the matching module, the expense attributes to the partially completed expense report or the finalized expense report, to determine a matching score; flagging the expense transaction data as a potentially duplicate transaction data when the matching comparisons determine a positive match between the additional expense transaction data and data included in an expense report designated as a finalized expense report; and importing the additional expense transaction data into a partially completed expense report when the matching comparisons determine a positive match between the additional expense transaction data and data included in the report designated as partially completed.

10. The method of claim 1, wherein the travel request and/or reservation attributes comprise: a travel event time, a travel event type, an identifier for a travel vendor, a frequent traveler affinity program code, cost information for a travel event, ticket number information for the travel event, confirmation number information for the travel event, an identifier representing the traveler, or any combination thereof.

11. The method of claim 1, wherein the presentation on the user interface to the user further comprises selectable options to designate the in-progress expense report as a finalized expense report or to designate the in-progress expense report as a partially completed expense report.

12. The method of claim 1, further comprising:
receiving, by the client module, a user selection designating the in-progress expense report as either partially completed or finalized; retaining the in-progress expense report, designated by the user as either partially completed or finalized, in the expense report database for further comparison to subsequently received expense transaction data.

13. A computerized system for integrating travel and expense information, comprising:
a processor configured for:
receiving, travel request data and/or travel reservation data corresponding to a travel event type, the request and/or reservation data further including travel request and/or reservation attributes;
generating, a travel request record, wherein the travel record includes the travel request and/or travel reservation information;
receiving from a plurality of sources, travel expense transaction data, the travel expense transaction data further comprising an expense transaction attribute;
generating a travel expense transaction record, wherein the travel expense transaction record comprises the expense transaction data;
designating an attribute included in the expense transaction record for comparison to a corresponding attribute included in the travel request record;
retrieving pre-determined matching criteria corresponding to the travel event type and to the designated expense transaction attribute;
comparing the expense transaction attribute to any corresponding request attribute using the pre-determined matching criteria and determining an initial matching score based on the comparison;
iteratively repeating the comparisons for each attribute included in the expense transaction record and the travel request record to produce an adjusted matching score;
determining whether the total matching score exceeds a first pre-determined threshold defined by the pre-determined matching criteria for the travel event type and the travel request attribute;
designating the expense transaction record and the travel request record as a positive match when the total matching score is above the first threshold;
determining whether the total matching score does not exceed the first pre-determined threshold defined by the pre-determined matching criteria for the travel event type, but does exceed a second pre-determined threshold, the second pre-determined threshold also defined by the pre-determined matching criteria for the travel event type; and
designating the expense transaction record and the travel request record as a possible match when the total matching score does not exceed the first pre-determined threshold but is above the second threshold.

14. The system of claim 13, wherein the travel expense transaction data comprises: merchant information; purchase date information; date of travel information; cost information; a travel event type; credit card data; transaction data obtained directly from a travel vendor; trusted receipts obtained directly from a travel vendor; or data manually entered into an expense reporting application; or any combination thereof.

15. The system of claim 13, wherein the travel event type comprises: air travel; rental transportation; limousine service; a travel agent feed; hotel; train service; or any combination thereof.

16. The system of claim 13, further comprising: identifying a purchaser who generated the expense receipt record.

17. The system of claim 16, wherein the identifying the purchaser comprises: reading personal identification information from the travel expense transaction data; matching credit card information contained in the travel expense transaction data to a database associating credit card information with individual purchasers; or matching frequent traveler account information contained in the travel expense transaction data to a database associating frequent traveler account information with individual travelers; or any combination thereof.

18. The system of claim 13, wherein the travel request data and/or the travel reservation data and/or the travel expense transaction data is limited to a specific traveler.

19. The system of claim 13, wherein an entity is able to track: consumption of travel data requests in order to estimate expenses that will be submitted in the future; travel request records not reserved through an entity's travel management system; compliance of outside entities to contractual agreements; compliance of travel policies of employees; duplicate submission of one expense; duplicate payment of one expense; or appropriate amount of travel costs; or any combination thereof.

20. The system of claim 13, wherein the travel request record and/or the travel expense transaction record can be provided manually and/or electronically.

21. The system of claim 13, further comprising: receiving additional travel expense transaction data including expense attributes; comparing the expense attributes to the partially completed expense report or the finalized expense report, to determine a matching score; flagging the expense transaction data as a potentially duplicate transaction data when the matching comparisons determine a positive match between the additional expense transaction data and data included in an expense report designated as a finalized expense report; and importing the additional expense transaction data into a partially completed expense report when the matching comparisons determine a positive match between the additional expense transaction data and data included in the report designated as partially completed.

22. The system of claim 13, wherein the travel request and/or reservation attributes comprise: a travel event time, a travel event type, an identifier for a travel vendor, a frequent traveler affinity program code, cost information for a travel event, ticket number information for the travel event, confirmation number information for the travel event, an identifier representing the traveler, or any combination thereof.

23. The system of claim 13, wherein the presentation on the user interface to the user further comprises selectable options to designate the in-progress expense report as a finalized expense report or to designate the in-progress expense report as a partially completed expense report.

24. The system of claim 13, further comprising:
receiving a user selection designating the in-progress expense report as either partially completed or finalized;
retaining the in-progress expense report, designated by the user as either partially completed or finalized, in the expense report database for further comparison to subsequently received expense transaction data.

* * * * *